United States Patent
Agrawal et al.

(10) Patent No.: US 11,603,500 B2
(45) Date of Patent: Mar. 14, 2023

(54) NATURAL GAS LIQUIDS UPGRADING PROCESS: TWO-STEP CATALYTIC PROCESS FOR ALKANE DEHYDROGENATION AND OLIGOMERIZATION

(71) Applicant: PURDUE RESEARCH FOUNDATION, West Lafayette, IN (US)

(72) Inventors: Rakesh Agrawal, West Lafayette, IN (US); Jeffrey J. Siirola, Kingsport, TN (US); Taufik Ridha, West Lafayette, IN (US); Yiru Li, West Lafayette, IN (US); Fabio H. Ribeiro, West Lafayette, IN (US); Jeffrey T. Miller, West Lafayette, IN (US)

(73) Assignee: PURDUE RESEARCH FOUNDATION, West Lafayette, IN (US)

( * ) Notice: Subject to any disclaimer, the term of this patent is extended or adjusted under 35 U.S.C. 154(b) by 307 days.

(21) Appl. No.: 16/635,778

(22) PCT Filed: Sep. 6, 2018

(86) PCT No.: PCT/US2018/049773
§ 371 (c)(1),
(2) Date: Jan. 31, 2020

(87) PCT Pub. No.: WO2019/051101
PCT Pub. Date: Mar. 14, 2019

(65) Prior Publication Data
US 2021/0139796 A1    May 13, 2021

Related U.S. Application Data

(60) Provisional application No. 62/555,601, filed on Sep. 7, 2017.

(51) Int. Cl.
*C10G 59/02* (2006.01)
*B01J 21/02* (2006.01)
*B01J 29/46* (2006.01)

(52) U.S. Cl.
CPC .............. *C10G 59/02* (2013.01); *B01J 21/02* (2013.01); *B01J 29/46* (2013.01)

(58) Field of Classification Search
CPC ......... C07B 35/04; C07C 17/357; C07C 5/32; C07C 5/321; C07C 5/322; C07C 5/324;
(Continued)

(56) References Cited

U.S. PATENT DOCUMENTS

| | | | |
|---|---|---|---|
| 4,656,016 A * | 4/1987 | Taramasso | C07C 2/864 502/79 |
| 4,751,341 A * | 6/1988 | Rodewald | B01J 29/40 585/722 |

(Continued)

FOREIGN PATENT DOCUMENTS

| | | | | |
|---|---|---|---|---|
| WO | WO 93/16020 | * | 8/1993 | C07C 2/12 |

OTHER PUBLICATIONS

International Search Report and Written Opinion for International Application No. PCT/US2018/049773 dated Nov. 28, 2018.
(Continued)

*Primary Examiner* — Brian A McCaig
(74) *Attorney, Agent, or Firm* — Edmonds & Cmaidalka, P.C.

(57) ABSTRACT

A process to catalytically transform natural gas liquid (NGL) into higher molecular weight hydrocarbons includes providing an NGL stream, catalytically dehydrogenating at least a portion of the NGL stream components to their corresponding alkene derivatives, catalytically oligomerizing at least a portion of the alkenes to higher molecular weight hydrocarbons and recovering the higher molecular weight hydrocar-
(Continued)

bons. The NGL stream can be extracted from a gas stream such as a gas stream coming from shale formations. The higher molecular weight hydrocarbons can be hydrocarbons that are liquid at ambient temperature and ambient pressure.

18 Claims, 6 Drawing Sheets

(58) Field of Classification Search
CPC ......... C07C 5/325; C07C 5/327; C07C 5/333; C07C 5/3332; C07C 5/3335; C07C 5/3337; C10G 11/02; C10G 11/04; C10G 50/00; C10G 57/02; C10G 59/02; B01J 21/02; B01J 29/46
See application file for complete search history.

(56) References Cited

U.S. PATENT DOCUMENTS

| | | | |
|---|---|---|---|
| 5,258,564 A | 11/1993 | Kocal et al. | |
| 5,264,643 A * | 11/1993 | DiGuiseppi | B01J 29/04 585/533 |
| 6,492,548 B1 * | 12/2002 | Brockwell | C07C 51/215 562/545 |
| 2006/0102468 A1 | 5/2006 | Monzyk et al. | |
| 2011/0282120 A1 * | 11/2011 | Buchanan | C07C 37/08 585/329 |
| 2012/0271085 A1 * | 10/2012 | Nesterenko | C10G 3/42 585/324 |
| 2014/0256892 A1 * | 9/2014 | Mathys | C08F 110/08 423/713 |
| 2015/0157998 A1 * | 6/2015 | Luebke | B01J 29/00 422/187 |
| 2015/0158786 A1 | 6/2015 | Mertens et al. | |
| 2018/0170838 A1 * | 6/2018 | Cao | C07C 5/48 |

OTHER PUBLICATIONS

Deimund et al.; "Nickel-Exchanged Zincosilicate Catalysts for the Oligomerization of Propylene", ACS Catalysis, vol. 4, Issue 11, Oct. 2014, p. 4189-4195.

Eswaramoorthi et al., "Synthesis, characterisation and catalytic performance of boron substituted SBA-15 molecular sieves"; Microporous and Mesoporous Materials, vol. 93, Issue 1-3, Jul. 28, 2006, p. 1-11.

* cited by examiner

NATURAL GAS LIQUIDS UPGRADING PROCESS: TWO-STEP CATALYTIC PROCESS FOR ALKANE DEHYDROGENATION AND OLIGOMERIZATION

CROSS-REFERENCE TO RELATED APPLICATIONS

The current application claims priority to U.S. Provisional Patent No. 62/555,601 filed on Sep. 7, 2017.

BACKGROUND

The present disclosure is directed to new hydrocarbon upgrading processes that include the dehydrogenation of light alkanes to their respective alkene derivatives, commonly known as olefins, followed by oligomerization of the light olefins to higher molecular weight hydrocarbon derivatives. The longer chain higher molecular weight hydrocarbons have a greater value than the lighter alkanes.

More efficient utilization of petroleum and gas reserves is an important strategy for the deployment of future energy generation. Shale gas has become an increasingly important source of natural gas in the United States, and the U.S. government's Energy Information Administration predicts that by 2040, seventy percent of the United States' natural gas supply will come from shale gas. Many of these shale gas formations contain wet gases, which can include substantial concentrations of natural gas liquids (NGL). NGL is a mixture of hydrocarbons made up primarily of ethane ($C_2$), propane ($C_3$), butane ($C_4$), and pentane ($C_5$). Several major shale gas formations such as Marcellus and Bakken are located far away from historically gas producing and processing region such as the Gulf Coast. These resources can be considered as stranded gas. Also, associated gas, which is a byproduct of shale oil production and may contain substantial concentration of NGL, is generally flared, vented, or injected back to the shale oil reservoir at high cost. Construction of pipelines to transport natural gas liquids to large existing processing plant complexes, such as the Gulf Coast, can be capital intensive. This creates an opportunity to upgrade this stranded natural gas, particularly its condensate, or NGL, into liquid fuel for use or further processing as it is easier to transport and distribute to the market.

The transformation of shale gas to higher molecular weight products such as transportation fuels, fine chemicals and polymers is one of the strategies to utilize the shale gas reserves to their highest value.

Currently, UOP Cyclar, Synfuels International ETG (Ethane to Gasoline), and Greyrock DFP (Direct Fuel Production) processes are examples of commercialized NGL to Liquids (NTL) processes. The Greyrock DFP process utilizes a small scale Fischer-Tropsch (FT) type process. Unlike a traditional FT process, their proprietary catalyst is claimed to eliminate the need for downstream liquid product upgrading. Synfuels International, Inc. employs a thermal cracking reactor followed by a series of proprietary reactors that ultimately yields gasoline blend stock as the final product. In the UOP Cyclar process, liquefied petroleum gas containing mainly propane and butane is converted to aromatics through dehydrogenation and subsequent aromatization. Aromatics, however, may not be suitable as liquid fuel and its market share is smaller than that of liquid fuel. Therefore, upgrading natural gas liquids into liquid fuel, having a minimal aromatic content, can increase the value of natural gas liquids and enable the distribution of the natural gas liquids into the liquid fuel market.

Currently, dehydrogenation of ethane is typically accomplished using steam cracking. In this process, ethane is subjected to high temperature (~800° C.) and mixed with steam. The resulting vapor contains ethylene, ethane, methane, acetylene, hydrogen, and steam. Typically, steam cracking vapor undergoes cryogenic separation, at great cost, to recover the olefins and recycle the unconverted alkanes. In addition, steam cracking is usually implemented at large scale; it is unlikely to be economical for small-scale operations in remote shale gas formation regions. UOP Oleflex and ThyssenKrupp STAR processes are also employed for only propane dehydrogenation using their respective proprietary catalysts. Currently, applicants know of no technology to uniformly dehydrogenate a mixture of one or more of $C_2$, $C_3$, $C_4$, and $C_5$ without the use of thermal cracking.

Upgrading stranded NGLs may facilitate its marketability and distribution into the liquid fuel market for use or into a refinery for further processing. Besides UOP Cyclar, Synfuels International ETG (Ethane to Gasoline), and Greyrock DFP (Direct Fuel Production) processes, no other major NGL-to-Liquid process has been commercialized.

BRIEF DESCRIPTION OF THE DRAWINGS

The accompanying drawings are incorporated into and form a part of the specification to illustrate aspects and examples of the present disclosure. These figures together with the description serve to explain the general principles of the disclosure. The figures are only for the purpose of illustrating examples of how the various aspects of the disclosure can be made and used and are not to be construed as limiting the disclosure to only the illustrated and described examples.

DETAILED DESCRIPTION

Figure 1:
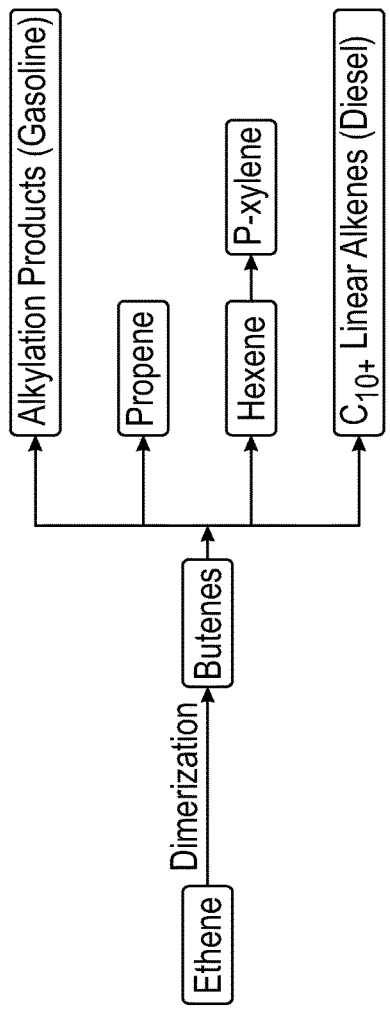
FIG. 1 is a simplified block flow diagram illustrating how ethene oligomerization forms an entry step chemistry to form higher molecular weight compounds.

The following detailed description illustrates embodiments of the present disclosure. These embodiments are described in sufficient detail to enable a person of ordinary skill in the art to practice these embodiments without undue experimentation. It should be understood, however, that the embodiments and examples described herein are given by way of illustration only, and not by way of limitation, the embodiments are chosen and described so that others skilled in the art may appreciate and understand the principles and practices of the present teachings. Various substitutions, modifications, additions, and rearrangements may be made that remain potential applications of the disclosed processes. Therefore, the description that follows is not to be taken as limiting on the scope of the appended claims. In particular, an element associated with a particular embodiment should not be limited to association with that particular embodiment but should be assumed to be capable of association with any embodiment discussed herein.

Definitions

For the purpose of this description and appended claims, the following terms are defined.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All processes described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

The term "alkane" or "paraffin" means substantially saturated compounds containing hydrogen and carbon only, e.g., those containing <1% (molar basis) of unsaturated carbon atoms. The term alkane encompasses $C_1$ to $C_6$ linear, iso, and cyclo alkanes.

As used herein, an "alkene" or "olefin" refers to any unsaturated hydrocarbon containing one or more pairs of carbon atoms linked by a double bond. The olefins described herein include cyclic or aliphatic olefins, and include mono-olefins, di-olefins, tri-olefins, etc.

As used herein, a "bimetallic catalyst" is a catalyst having at least two metal components. The term does not limit the number of metal components to only two. The two metals are, at least partially present in the metallic phase and/or in a metallic alloy state.

The term "$C_n$" hydrocarbon wherein n is a positive integer, e.g., 1, 2, 3, 4, or 5, means hydrocarbon having n carbon atom(s) per molecule. The term "$C_{n+}$" hydrocarbon wherein n is a positive integer, e.g., 1, 2, 3, 4, or 5, means hydrocarbon having at least n carbon atom(s) per molecule. The term "$C_{n-}$" hydrocarbon wherein n is a positive integer, e.g., 1, 2, 3, 4, or 5, means hydrocarbon having no more than n number of carbon atom(s) per molecule.

As used herein, a "catalyst" is any substance or material which changes the rate of conversion of alkanes to alkenes but is not, itself, consumed.

The terms "comprise," "comprises," "comprising," "include," "includes," "including," "have," "haves," and "having" are interchangeable and not intended to be limiting.

The term "hydrocarbon" means compounds containing hydrogen bound to carbon, and encompasses (i) saturated hydrocarbon, (ii) unsaturated hydrocarbon, and (iii) mixtures of hydrocarbons, including mixtures of hydrocarbons (saturated and/or unsaturated) having different values of n.

The term "liquid hydrocarbon" means hydrocarbons that are liquid at room temperature and ambient pressure.

The term "support" or "substrate" as used herein is not meant to indicate that this component is necessarily inactive, while the other metals and/or promoters are the active species. On the contrary, the support or substrate can be an active part of the catalyst. The term substrate would merely imply that the substrate makes up a significant quantity, generally 10% or more by weight, of the entire catalyst.

The term "zeolite" means microporous, crystalline silicon oxide minerals commonly used as commercial adsorbents and catalysts.

The present disclosure relates generally to new hydrocarbon upgrading processes that include the dehydrogenation of light alkanes to their respective alkene derivatives, commonly known as olefins, followed by oligomerization of the light olefins to higher molecular weight hydrocarbon derivatives. The longer chain higher molecular weight hydrocarbons have a greater value than the lighter alkanes. Various embodiments to the two-step process are disclosed along with additional elements that can be implemented such as efficiency improvements and integration into existing processes and/or facilities.

Dehydrogenation of NGLs followed by oligomerization of the resulting alkenes may have the potential as an economically attractive process. This process is termed as Natural Gas Liquid-to-Liquid (NTL). In the NTL process, a mixture of light alkanes such as ethane, propane, butane, and pentane and combinations thereof are activated by catalytically transforming them into their corresponding olefins. Then, without separation of the olefins from the unconverted alkanes, the olefins are then catalytically oligomerized to form higher molecular weight liquid hydrocarbons. The resulting hydrocarbons may still contain olefins and can optionally have a final saturation step to fully saturate the hydrocarbon liquids. The resulting hydrocarbons can then be recovered and can serve as drop-in liquid fuels, as a refinery feedstock, as feedstock for chemical plants or other uses.

One aspect of the invention is that, instead of steam cracking, catalytic dehydrogenation is adopted in the process disclosed herein. It has the potential to efficiently transform light alkanes to alkenes. As stated earlier, steam cracking is commonly implemented at large scale and it is unlikely to be economical at small scale. In addition, steam in the product stream is detrimental to the oligomerization catalyst life; therefore, requires separation of the steam prior to processing of the olefins. Production of olefins produced by alkane dehydrogenation allows for direct oligomerization of the mixed olefin, alkane and hydrogen stream without costly separation. Considering the remote locations and discounted prices of stranded gas, modular scale process may be preferable to exploit the economic opportunities presented by stranded natural gas and its condensate and NGL content.

Considering the heat duty alone, steam cracking consumes approximately 30% more energy for every ethylene molecule produced compared to catalytic dehydrogenation and this is mainly due to the heat demand for steam generation in steam cracking. In addition, given appropriate catalysts, catalytic dehydrogenation can be more selective towards alkenes and minimizes the production of by-products, which would call for the need of either downstream upgrading or removal.

Another aspect of the invention is deploying the described NTL processes using catalytic dehydrogenation and oligomerization at modular scales. Depending on the location and behavior of the shale gas wells, the economic opportunity presented by shale gas NGL's can be exploited at either large or small scales or both. Modular NTL plants enable local processing of NGL from stranded or associated gas, which then can be directly sold into the local market and mitigates the expense associated with distribution of the liquid products from these modular plants. Process modularization of the described NTL process may be achieved through process intensification, process integration, and novel unit operation designs of the catalytic reactors and other unit operations described in the processes.

Embodiments of the present disclosure include the addition of an NTL plant to an existing NGL extraction plant. In many instances NGL extraction plants have no market for the ethane, or the economics are such that the extraction, transportation, fractionation and marketing of the ethane costs more than the ethane can bring, thus a net loss for the NGL extraction plant operator. In these instances the plant can be operated in an "ethane rejection" mode where a large portion of the ethane is sent out with the residue gas and not recovered in the NGL stream. This contained ethane remains in the natural gas stream and is sold at methane prices and used as natural gas. This is a tremendous waste of a natural resource. The addition of an NTL plant to an existing NGL extraction plant can enable the recovery of ethane by operating the NGL plant in an "ethane recovery" mode, having the mixed NGL stream, including the additional ethane recovered, as a feed stream to the NTL plant, and the NTL plant producing a heavier molecular weight hydrocarbon stream that contains little or no ethane content. Optionally the ethane, with or without higher hydrocarbons, can be separated from the NGL stream and fed to an NTL plant, producing a heavier molecular weight hydrocarbon stream that contains little or no ethane content. The heavier molecular weight hydrocarbon stream can then be blended with the NGL stream to produce a mixed hydrocarbon stream that contains little or no ethane content. In this way the ethane contained in the natural gas stream can be recovered and upgraded by the NTL plant to an economically profitable product. The heavier molecular weight hydrocarbon stream from the NTL plant can be further processed in the same manner as the NGL stream prior to the installation of the NTL plant.

Dehydrogenation

The present disclosure includes one or more dehydrogenation reactions of alkanes to olefins. The catalytic dehydrogenation of hydrocarbons according to the formula $C_nH_{2n+2} \leftrightarrow C_nH_{2n}+H_2$, is a highly endothermic equilibrium reaction, the reaction rate of which is limited thermodynamically and which depends on the respective partial pressures and temperature. The dehydrogenation reaction is favored by low partial pressures of the hydrocarbons and by high temperatures.

The dehydrogenation reactions of alkanes to olefins can be performed over conventional catalysts commonly known in the art. Commercially available light alkane dehydrogenation catalysts currently in use are Pt—Sn and $CrO_x$ based catalysts supported on an alkali (Na/K) modified alumina. A Pt—Sn catalyst is used in the Oleflex process which utilizes a continuous fluidized catalyst bed. The Oleflex process is commercially offered by Honeywell UOP. Alternately a $CrO_x$ catalyst is used in the Catofin process licensed by Lummus Technology, a CB&I company, which uses parallel fixed beds. Both of these catalysts are reported to achieve selectivity above 90%. Nevertheless, frequent regeneration is needed in industrial operation and the catalysts have a total life of approximately 1 to 3 years.

Due to equilibrium limitations, these selective alkane dehydrogenation reactions are typically carried out at a high temperature to maximize the alkene yield and minimize yields of undesired products such as alkynes, diolefins, and cracking products (lower molecular weight alkane olefin mixtures). Useful catalysts must exhibit high activity and selectivity for the desired dehydrogenation process and a minimal rate of deactivation. Dehydrogenation reactions are known to produce coke which is highly refractory and the coke formation leads to catalyst deactivation. Coke removal can require combustion in oxygen containing gas at temperatures greater than 600° C. Desirable catalysts, therefore, must retain high alkane dehydrogenation activity following high temperature regeneration.

The dehydrogenation reactions can be performed over novel catalyst compositions. In one embodiment the dehydrogenation catalyst is bimetallic and comprises a combination of one or more Group VIII noble metal, such as platinum or palladium, and a metal selected from the group consisting of manganese, vanadium, chromium and titanium, on a support. The Group VIII noble metal can be present in an amount ranging from 0.001 wt % to 30 wt % on an elemental basis of the catalyst composition. The manganese, vanadium, chromium, titanium, and combinations thereof, can be present in an amount from 0.001 wt % to 30 wt % on an elemental basis of the catalyst composition and are present, at least partially in the metallic phase. The manganese, vanadium, chromium, titanium, and combinations thereof can, at least partially be present in an alloy state. Non-limiting examples of support can include silicon dioxide, aluminum oxide and titanium dioxide. The catalyst can be an active and selective catalyst for the catalytic dehydrogenation of alkanes to olefins while retaining high activity and selectivity even following repeated regeneration by burning coke in oxygen.

The catalysts of the present disclosure can be prepared by impregnating a support material with manganese, vanadium, chromium, titanium, or combinations thereof, to form a precursor. The precursor can then be dried and calcined. The amount of manganese, vanadium, chromium, titanium, and/or combinations thereof, to be impregnated can range from about 0.001 wt % to about 30 wt %, optionally from about 1.0 wt % to about 5 wt % calculated on an elemental basis of the final catalyst composition.

A metal selected from the group consisting of Group VIII noble metal(s) is then impregnated onto the modified support material to provide dehydrogenation functions. The Group VIII noble metal can be selected from the group of platinum, palladium, osmium, ruthenium, iridium, rhodium, or combinations thereof. In an embodiment either platinum, palladium, or combinations thereof are employed. The amount of noble metal loading to be impregnated can range from about 0.001 wt % to about 30 wt % calculated on an elemental basis of the final catalyst composition. It is desirable that the catalyst will contain from about 0.1 wt % to about 5 wt % noble metal, most desirable about 0.3 wt % to about 2 wt % noble metal. As an example, platinum loading on silica can be accomplished via incipient wetness impregnation techniques using an aqueous solution of platinum tetraammine nitrate $Pt(NH_3)_4(NO_3)_2$ having a pH adjusted with ammonium hydroxide. Following noble metal loading the catalyst can be dried, calcined and reduced. Platinum loading on alumina can be accomplished via incipient wetness impregnation techniques using an aqueous solution of chloroplatinic acid $H_2PtCl_6$ having a pH adjusted solution with HCl.

In an embodiment the dehydrogenation catalyst is a bimetallic catalyst composition that includes a Group VIII noble metal selected from the group consisting of nickel, iron, cobalt, and combinations thereof, along with a metal selected from the group consisting of molybdenum, indium, phosphorous, zinc and combinations thereof, and a support. In an embodiment the Group VIII noble metal can be present in an amount ranging from 0.01 wt % to 30 wt % on an elemental basis of the catalyst composition. The molybdenum, indium, phosphorous, zinc, and combinations thereof, can be present in an amount from 0.001 to 30 wt % on an elemental basis of the catalyst composition. In an embodiment the metal selected from the group consisting of molybdenum, indium, phosphorous, zinc, and combinations thereof are present, at least partially in the metallic phase.

The bimetallic catalyst composition can be produced by providing a support material, adding to the support material a Group VIII noble metal selected from the group consisting of nickel, iron, cobalt, and combinations thereof, and a metal selected from the group consisting of molybdenum, indium, phosphorous, zinc, and combinations thereof, to make a catalyst material, calcining the catalyst material; and reducing the catalyst material to form a dehydrogenation catalyst.

The metals can be added in any suitable manner known in the art, such as non-limiting examples of supported on a substrate or an inert support, added to a binder, placed on or within a zeolite or other catalyst support, such as by ion exchange, incipient wetness impregnation, pore volume impregnation, soaking, percolation, wash coat, precipitation, and gel formation.

The various elements that make up the components for the catalyst can be derived from any suitable source, such as in their elemental form, or in compounds or coordination complexes of an organic or inorganic nature, such as carbonates, oxides, hydroxides, nitrates, acetates, and chlorides. The elements and/or compounds can be prepared by any suitable method known in the art for the preparation of such materials.

The active metals individually can range from 0.01% to 20% by weight of the catalyst, optionally from 0.1% to 10%. If more than one active metal is combined, they together generally can range from 0.01% up to 30% by weight of the catalyst. The manganese, vanadium, chromium, titanium, and combinations thereof can, at least partially be present in the metallic phase. The manganese, vanadium, chromium, titanium, and combinations thereof can, at least partially be present in an alloy state.

The supports of the present disclosure can be any suitable support, such as for non-limiting examples: silicon dioxide, aluminum oxide, titanium dioxide, zeolites, silica-alumina, cerium dioxide, zirconium dioxide, magnesium oxide, silica pillared clays, metal modified silica, metal oxide modified silica, silica-pillared clays, metal oxide modified silica-pillared clays, silica-pillared micas, metal oxide modified silica-pillared micas, silica-pillared tetrasilicic mica, silica-pillared taeniolite, zeolite, molecular sieve, and combinations thereof.

The present disclosure is not limited by the method of dehydrogenation catalyst preparation, and all suitable methods should be considered to fall within the scope herein. Conventional methods include co-precipitation from an aqueous, an organic, or a combination solution-dispersion, impregnation, incipient wetness impregnation, dry mixing, wet mixing or the like, alone or in various combinations. In general, any method can be used which provides compositions of matter containing the prescribed components in effective amounts. Other impregnation techniques such as by soaking, pore volume impregnation, or percolation can optionally be used. Alternate methods such as ion exchange, wash coat, precipitation, and gel formation can also be used.

Binder material, extrusion aids or other additives can be added to the dehydrogenation catalyst composition or the final catalyst composition can be added to a structured material that provides a support structure. The combination of the dehydrogenation combined with additional elements such as a binder, extrusion aid, structured material, or other additives, and their respective calcination products, are included within the scope of the invention.

The prepared dehydrogenation catalyst can be ground, pressed, sieved, shaped, extruded and/or otherwise processed into a form suitable for loading into a reactor. The reactor can be any type known in the art, such as a fixed bed, fluidized bed, or swing bed reactor. Optionally an inert material, such as quartz, alpha-alumina, or others can be used to support the catalyst bed and to locate the catalyst within the bed. Depending on the catalyst, a pretreatment of the catalyst may, or may not, be necessary.

In an embodiment, the disclosure includes a process for the dehydrogenation of alkanes to olefins. The process includes the steps of introducing an alkane feedstock into a reaction chamber, passing the feedstock over a dehydrogenation catalyst at reaction conditions effective to provide a product containing olefin hydrocarbons, and regenerating the catalyst in-situ, when necessary.

The alkane feedstock can be alkanes containing less than 6 carbon atoms. The feedstock can consist primarily of $C_2$-$C_5$ alkanes. An embodiment of the invention provides for the use of ethane or propane or butane or a mixture of these gases as the starting material. Embodiments of the invention are particularly suitable to produce ethene or propene or butene or a mixture of these olefins. The alkane feedstock can be obtained from the side product of various hydrocarbon processing plants, for instance, the offgas of an FCC cracker or other refiners processes, refinery fuel gas, or shale gas hydrocarbons. One source of alkane feedstock is from NGL's that can be extracted by gas processing plants, often a cryogenic process that extract the NGL's from a gas stream, such as a gas stream produced from a shale formation. One source of alkane feedstock is liquid petroleum gas (LPG), which consists mainly of the propane and butane fraction and can be recovered from gas and oil fields and petroleum refining operations. Co-feed can contain hydrogen. In an illustrative embodiment the alkane feed can contain primarily ethane. In an illustrative embodiment the alkane feed can contain primarily propane. In an illustrative embodiment the alkane feed can contain primarily butane. In an illustrative embodiment the alkane feed can contain primarily ethane and propane. In an illustrative embodiment the alkane feed can contain primarily propane and butane. In an illustrative embodiment the alkane feed can contain primarily butane and pentane. In an illustrative embodiment the alkane feed can contain primarily $C_3$-$C_5$ alkanes. In an illustrative embodiment the alkane feed can contain primarily $C_4$-$C_5$ alkanes.

The reaction chamber used in the dehydrogenation reaction may use one or more than one dehydrogenation catalysts. They can also house any suitable catalyst system, such as a fixed catalyst bed, a moving bed or a fluidized bed. Single or multiple catalyst beds can be used, and the reactor can be a swing reactor. The catalysts described herein may be used in any suitable reactor. The process could utilize a series of fixed bed reactors, where each reactor could be independently regenerated, a moving bed reactor where the catalysts moves through the reactor and is regenerated in a separate section of the plant, or a fluidized bed reactor, where the catalyst is circulated through the reactor and regenerated in a separate vessel.

The dehydrogenation reaction can take place at a temperature of from 350° C. to 1000° C., optionally from 400° C. to 800° C., optionally from 450° C. to 750° C. The pressure can be in the range of from 3 psig to 600 psig, optionally from 3 psig to 300 psig, optionally from 3 psig to 150 psig. The weight hourly space velocity can be from 0.3 to 50 hr$^{-1}$, optionally from 0.3 to 10 hr$^{-1}$, and optionally from 0.3 to 3 hr$^{-1}$.

The dehydrogenation reaction can be performed adiabatically or non-adiabatically or approximately isothermally. To achieve reasonable reaction rates, several catalyst beds are normally arranged in series and the reaction system is re-heated downstream of each catalyst bed.

If the dehydrogenation is performed in a non-adiabatically operated catalyst bed, the catalyst bed can be heated to maintain elevated temperature. Because the temperature in the reaction system is kept constant, the reaction rates may be kept appropriately high. Because of the location of the point of thermodynamic equilibrium, however, the disadvantage is that these high reaction rates can only be achieved at elevated temperatures, because of which the selectivity of olefin formation may be reduced. Hence, consecutive reactions will increasingly take place, so that undesired products may form, such as $CH_4$ and coke.

The by-products thus formed, especially finely dispersed coke, can deposit during the reaction on the catalyst, thus causing its state to change continually. The catalyst can become coated with an undesired substance and is thus less accessible for the reactants. This means that the catalyst becomes deactivated. The activity of the catalyst for alkane dehydrogenation and the selectivity for alkene formation may in turn deteriorate. This would result in deterioration of the efficiency of the process. To counter-act this negative influence on the process, the catalyst will have to be regenerated after a certain reaction period to recover its activity.

In an embodiment the dehydrogenation catalyst of the present disclosure can undergo in-situ regeneration. The regeneration can be done at the reaction temperature by burning of carbon with oxygen concentrations between 0.1-20%, optionally from 0.3-10%, and optionally from 0.5-3%. Alternatively, the catalyst can be regenerated with hydrogen at the reaction temperature. In an embodiment the catalyst of the present disclosure can undergo ex-situ regeneration.

Depending on its characteristics, the catalyst can be regenerated by bringing it in contact with an oxygen-bearing gas under conditions defined for the regeneration of the catalyst. The conditions for such regeneration may differ from those required for the dehydrogenation. An oxygen-bearing gas diluted with steam may also be fed through the catalyst. Because of this procedure, the by-products on the catalyst are reduced, with the result that the catalyst can regain its activity. If an oxygen-bearing gas diluted with steam is used for catalyst regeneration, the carbon-bearing deposit reacts to form carbon dioxide as the main product. The carbon-bearing deposit is converted to gaseous products by this reaction and is removed from the system.

As the conditions for the alkane dehydrogenation process differ from the catalyst regeneration process, the alkane dehydrogenation process will be interrupted after a certain period of operation and substituted by the catalyst regeneration process. Thereafter, the reactor bed is purged and again made available for dehydrogenation. Both these processes, i.e. the alkane dehydrogenation and catalyst regeneration, are thus performed periodically. To render the overall process economically efficient, this can take place in two or a plurality of catalyst beds, in which the reaction and regeneration processes are alternately implemented. To ensure optimum catalyst regeneration, the regeneration process can be instrumented, monitored and controlled. For fixed bed reactors, a plurality of reactors in parallel can be employed to enable the concurrent regeneration of the reactors while other reactors are still in use.

The dehydrogenation reaction products can then be further processed, such as in an oligomerization reaction.

Oligomerization

The present disclosure includes one or more dimerization and/or oligomerization reactions of light olefins. More particularly, the present disclosure relates to catalysts which can enable oligomerization of light olefins to longer chain olefin derivatives.

The oligomerization of light olefins, such as alkene molecules having from 2 to 5 carbon atoms, is an important industrial reaction and represents a route to the production of intermediates used to produce motor fuels, plasticizers, pharmaceuticals, dyes, resins, detergents, lubricants and additives. The oligomerization of light olefins, such as ethene and propene, represents an important industrial route to the production of environmentally friendly synthetic liquid products, especially diesel fuels substantially free of sulfur and aromatics. Thus, ethene oligomerization forms an entry step chemistry to form higher molecular weight compounds, which is shown in the block flow diagram of FIG. 1.

Embodiments of the present disclosure can include an oligomerization catalyst having transition metal ions selected from the elements consisting of chromium, nickel, iron, cobalt, and combinations thereof. The amount of the Group VIII noble metal can range from about 0.001 wt % to about 30 wt %, optionally from about 0.01 wt % to about 10 wt %, optionally from about 1.0 wt % to about 5 wt %, all calculated on an elemental basis of the final catalyst composition. Embodiments of the oligomerization catalyst include nickel present in the form of $Ni^{2+}$ cations in an amount ranging from 0.001 wt % to 30 wt %, optionally from about 0.01 wt % to about 10 wt %, on an elemental basis of the catalyst composition within a molecular sieve support having framework heteroatoms selected from the group consisting of $Al^{3+}$, $Zn^{2+}$, and combinations thereof, wherein the $Ni^{2+}$ cations are coordinated with two framework $Al^{3+}$ heteroatom centers in a paired configuration or with one framework $Zn^{2+}$ heteroatom center, or combinations thereof. In an embodiment the catalyst is treated for $H^+$ sites with the addition of $Li^+$.

Embodiments of the present disclosure can include an oligomerization catalyst comprising a crystalline, microporous zeolite with MFI topology and heteroatoms of aluminum, gallium, or iron within the MFI structure having a first bulk heteroatom content and first crystal size. Trivalent boron atoms are added within the support matrixes that have been substituted for tetravalent silicon atoms. The selectivity toward oligomers is enhanced compared to catalysts without boron with similar bulk heteroatom content and crystal size. In an embodiment the boron is present in an amount ranging from 0.001 wt % to about 10 wt %, optionally from about 0.01 wt % to 5 wt % on an elemental basis of the catalyst composition. In an embodiment the aluminum, gallium or iron are present in an amount from 0.001 wt % to about 10 wt %, optionally from about 0.01 to 5 wt % on an elemental basis of the catalyst composition. In an embodiment the substitution of trivalent boron atoms for tetravalent silicon atoms have low activity Brönsted acid sites for catalysis. In an embodiment the Brönsted acid sites that compensate framework boron atoms are unreactive compared to those that compensate framework aluminum or gallium or iron atoms. In an embodiment the Brønsted acid sites that compensate framework boron atoms are significantly weaker acid sites compared to those that compensate framework aluminum or gallium or iron atoms.

The various elements that make up the components for the oligomerization catalyst can be derived from any suitable source, such as in their elemental form, or in compounds or coordination complexes of an organic or inorganic nature, such as carbonates, oxides, hydroxides, nitrates, acetates, chlorides, phosphates, sulfides and sulfonates. The elements and/or compounds can be prepared by any suitable method known in the art for the preparation of such materials.

The present disclosure is not limited by the method of oligomerization catalyst preparation, and all suitable methods should be considered to fall within the scope herein.

In an embodiment the catalyst of the present disclosure can undergo in-situ regeneration, which can lower operating costs by decreasing the amount of time the reactor must be offline. The regeneration can be done by hydrogen and water vapor stripping at the reaction temperature. In an embodiment the catalyst of the present disclosure can undergo ex-situ regeneration.

An embodiment of the present disclosure is a process for the oligomerization of alkenes to higher molecular weight hydrocarbons. The process includes the steps of introducing an alkene feedstock into a reaction chamber, passing the feedstock over an oligomerization catalyst at reaction conditions effective to produce oligomerization reactions converting a portion of the alkenes to higher molecular weight hydrocarbons. In an embodiment the higher molecular weight hydrocarbons are substantially free of aromatic hydrocarbons.

The alkene feedstock can be alkenes containing less than 10 carbon atoms. The feedstock can consist primarily of $C_2$-$C_5$ alkenes. The alkene feedstock can be obtained from any suitable source. In an illustrative embodiment the alkene feed can contain primarily ethene. In an illustrative embodiment the alkene feed can contain primarily propene. In an illustrative embodiment the alkene feed can contain primarily butene. In an illustrative embodiment the alkene feed can contain primarily ethene and propene. In an illustrative embodiment the alkene feed can contain primarily propene and butene. In an illustrative embodiment the alkene feed can contain primarily butene and pentene. In an illustrative embodiment the alkene feed can contain primarily $C_3$-$C_5$ alkenes. In an illustrative embodiment the alkene feed can contain primarily $C_4$-$C_5$ alkenes.

The reaction chamber can house any suitable catalyst system, such as a fixed catalyst bed, a moving bed or a fluidized bed. Single or multiple catalyst beds can be used, and the reactor can be a swing reactor. In embodiments the reaction can take place at a temperature of from 50° C. to 350° C. The pressure can be in the range of from 0.5 psig to 600 psig. The weight hourly space velocity can be from 0.5 to 600 $hr^{-1}$.

The reaction products can be processed further if needed, such as with a saturation step to more fully saturate the produced hydrocarbon liquids and reduce the olefin content. The final reaction products can be separated by cooling or other standard recovery or separation techniques.

Process

Figure 2:
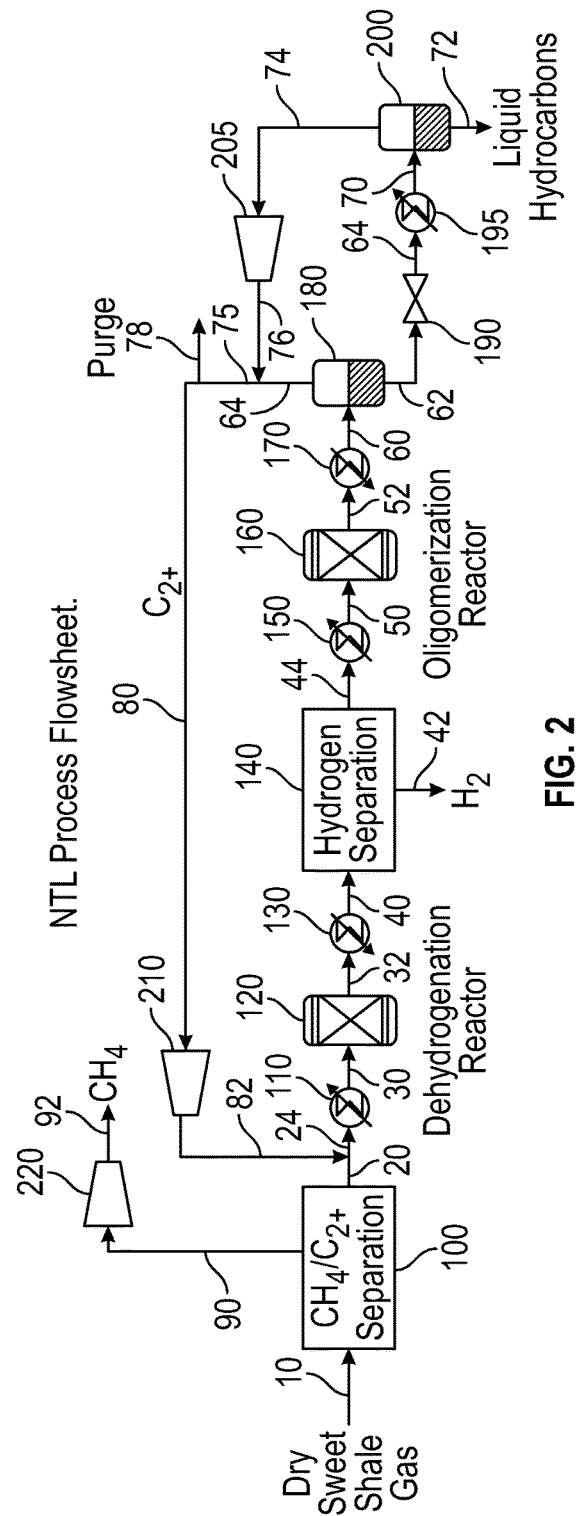
FIG. 2 is a block flow diagram for an embodiment of the present disclosure.

The NTL process includes converting NGLs to their corresponding olefins through catalytic dehydrogenation. The olefins are then coupled together to form high molecular weight mono-olefin hydrocarbons through catalytic oligomerization. The higher molecular weight hydrocarbons can be recovered through a separation system as a liquid product. The dehydrogenation and oligomerization reactions can be performed in separate reactors, such as a dehydrogenation reactor and oligomerization reactor placed in series, or alternatively both the dehydrogenation and oligomerization reactions can be performed within a single combined reactor. If in a combined reactor the dehydrogenation reaction can proceed the oligomerization reaction by locating a dehydrogenation catalyst bed followed by an oligomerization catalyst bed. Alternatively the dehydrogenation catalyst and oligomerization catalyst can both be located within a mixed bed, wherein the dehydrogenation reaction and oligomerization reaction can each occur within the mixed bed. Following separation of the product liquid, the unconverted alkane gas stream is recycled to the process. The liquid product can undergo further treatment as needed, such as a saturation procedure to reduce the olefin content and make a more saturated liquid hydrocarbon stream suitable for fuel blending. FIG. 2 illustrates one embodiment of this transformation process, which is described below.

Referring now to FIG. 2, the feed stream 10 can be a hydrocarbon containing gas, which can be a mixture of methane ($C_1$), $C_2$, $C_3$, $C_4$, and $C_5$ which can include trace amounts of $H_2S$, $CO_2$, $N_2$, and $H_2O$. Depending on the concentration of methane in the feed gas stream 10, methane may need to be removed to a low concentration in stream 20 through a separation system 100, consisting of any suitable separation scheme such as a typical cryogenic NGL extraction process, distillation and/or membrane technology. The separated methane stream 90 can then be used as fuel gas or sold as a product. After methane removal, the methane-poor feed 20 is combined with a recycle stream, $C_{2+}$, 82 which is predominantly unconverted ethane, propane, ethylene, butylene, and residual hydrogen. The combined stream 24 is then typically heated to an elevated temperature (650-800° C.) through a heat exchange unit 110 and is passed to a bed of dehydrogenation catalyst within a dehydrogenation reactor 120.

In the dehydrogenation reactor 120, the reactor typically operates at elevated temperature (500-800° C.) and medium pressure (2-25 bar). The conversions of ethane, propane, butane, and pentane to their olefins counterparts are endothermic and limited by thermodynamic equilibrium. Although not shown in FIG. 2, heat is generally provided to the dehydrogenation reactor to increase olefin formation. The supported catalyst is designed so that formation of undesirable side products, such as methane and acetylene, is minimized. Bimetallic catalysts can be used as a dehydrogenation catalyst comprised of a Group VIII metal, such as Pt, Pd, Ni, Co, Fe, Rh, Ir, Ru and a non-catalytic metal such as Zn, Ga, Sn, In, Mn, V, Cr, or Ti. Non-limiting combinations of catalytic and non-catalytic bimetallic catalysts are PtZn, PdZn, PtIn, PdIn, PtSn, Pt, Mn, PtCr, PtV, PtTi, PdMn, PtCu, and NiIn, which can be employed to achieve the desired reaction. Additionally, the catalysts may include non-metallic, oxide catalysts of Cr, Co, Zn, Ga, or Ni stabilized by phosphate. The support can include a refractory oxide such as silica, alumina, silica-alumina, titania, magnesium oxide, zeolites and aluminophosphates.

The stream 32 exiting the dehydrogenation reactor 120 contains a mixture of olefins, unconverted alkanes, and hydrogen. Stream 32 is then cooled to a lower temperature (200-600° C.) through a heat exchange process in heat exchanger 130. Depending on the hydrogen tolerance of the downstream processes, some portion of the hydrogen must be first removed from the cooled stream 40.

Through a hydrogen separation system 140, such as membrane, stripping, and distillation, sufficient hydrogen 42 can be removed from the system to have only a residual concentration of hydrogen in stream 44, which may be needed to ensure catalyst stability and mass balance in the oligomerization reactor 160. The hydrogen separation system 140 should possess high selectivity to hydrogen such that the losses of other components are minimized. After removal of the hydrogen in stream 42, the temperature of stream 44 may be adjusted in heat exchanger 150 and stream 50 is then fed to another reactor 160 with a bed of oligomerization catalyst.

The oligomerization reactor 160 can operate at a relatively low temperature (200-600° C.) and preferably medium pressure (2-50 bar). In the oligomerization catalyst bed, the conversion of olefins may not go to completion. The stream 52 exiting this reactor may contain a mixture of $C_1$-$C_9$ with a majority of the higher molecular weight molecules being greater than $C_6$ hydrocarbons, and preferably $C_{10}$-$C_{18}$, or higher molecular weight. Catalysts such as H-$ZSM_5$, and especially Boron-modified H-(Al)ZSM-5 can be employed in order to achieve the desirable reaction.

Stream 52 is then cooled to a lower temperature (2°-10° C.) in heat exchanger 170 to condense the high molecular weight hydrocarbons. At this condition, low molecular weight hydrocarbons may also be dissolved in the condensed liquid. The two-phase stream 60 is then separated in a two-phase separator 180. The liquid 62 from separator 180 can then be brought to ambient pressure and ambient temperature through a pressure drop across a Joule-Thompson value or a dense fluid expander 190 and heat exchange unit 195. This results in a two-phase stream 70 which can then be fed to another two-phase separator 200. The liquid 72 from separator 200 is the product which consists of the high molecular weight hydrocarbon molecules.

The vapor stream 74 from separator 200 contains the unconverted molecules such as ethane, propane, butane, ethylene, propylene, and butylene. Vapor stream 74 from separator 200 is boosted in pressure across booster 205 and combined with vapor stream 65 from separator 180. Pressure of the vapor from the second flash tank may not need to be increased through booster 205, instead pressure of stream 64 may be reduced and matched to the pressure of stream 74. Finally, the combined stream 76, after an optional purge stream 78, is increased in pressure across recycle compressor 210 to provide a recycle stream 82 which is mixed with the methane-poor stream 20, which results in combined stream 24 that subsequently enters the dehydrogenation reactor 120.

Techno-economic analysis of this process on a basis of 96 MMSCFD of shale gas containing ~30% mole of NGL from the Bakken field estimated a total capital cost of 251 million USD with annual operating cost of 19.8 million USD producing 15,000 bbl/day of liquid hydrocarbons. A Fischer-Tropsch process of the same size is estimated to have a total capital cost ranging from 300-525 million USD with an annual operating cost between 11-28 million USD. This analysis indicates the NTL process is economically lucrative compared to existing technologies.

Figure 3:
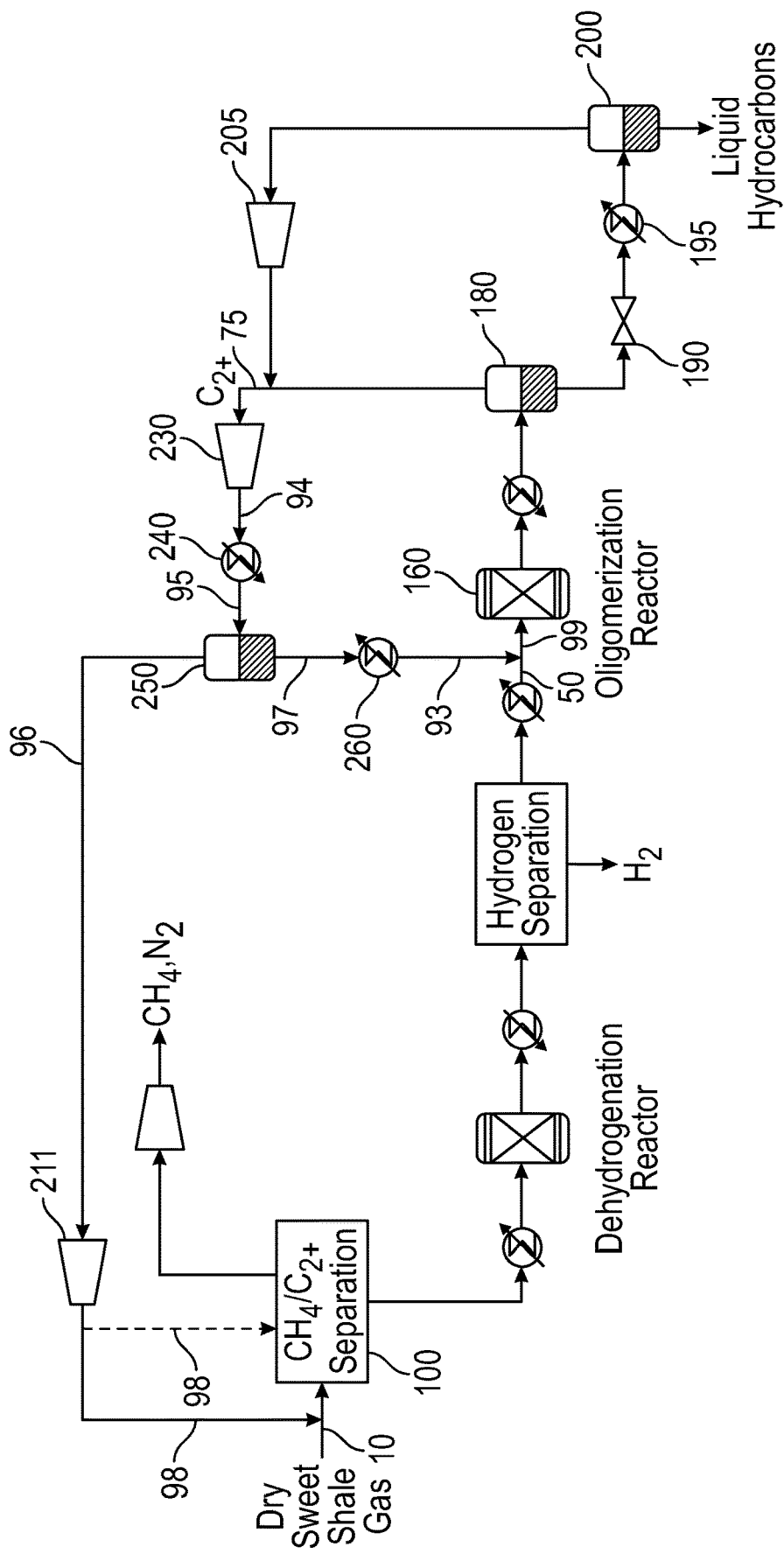
FIG. 3 is a block flow diagram for an embodiment of the present disclosure.

FIG. 3 shows a variation of the process described in FIG. 2. Consider the NTL process shown in FIG. 2, when methane recovery is not very high in separator 100, the high $C_1$ content in stream 20 necessitates very large recycle flow in stream 80 and 82 leading to high capital and operating expenses. Therefore, the process in FIG. 3 is designed to handle poor separation on separator 100. To accommodate for this variation, separator 250 is utilized to maximize the recovery of light alkanes and alkenes from the recycle stream. Separators 250, 180, and 200 along with heat exchangers 195, 240 and pressure changers 190, 205, 230 constitute a multi-stage separator configuration. Vapor stream 75, instead of being directly recycled after an optional purge, is compressed in pressure booster 230 followed by cooling to low temperature (2°-10° C.) in heat exchanger 240 which results in a two-phase stream 95. Stream 95 undergoes two phase separation in separator 250. Vapor stream 96 pressure is increased through compressor 211. To avoid methane accumulation in the recycle stream, vapor stream 98 exiting compressor 211 can be recycled to the feed stream 10 or directly into separator 100 depending on the unit operations that is employed for separator 100. Liquid stream 97 containing a substantial concentration (~30 mole %) of unconverted $C_3$ and $C_4$ olefins with minor concentration of $C_2$ olefin can be heated, such as to oligomerization reactor 160 operating temperature, in heat exchange unit 260. Vapor stream 93 exiting heat exchange unit 260 is then combined with stream 50 which results in stream 99 that enters the oligomerization reactor 160. The recycle ratio of this process was found to be 46% less than that of the process in FIG. 2 in simulations of the two processes. This NTL process was found to reduce capital and operating costs by 8% and 26%, respectively, compared to the process described in FIG. 2.

Figure 4:
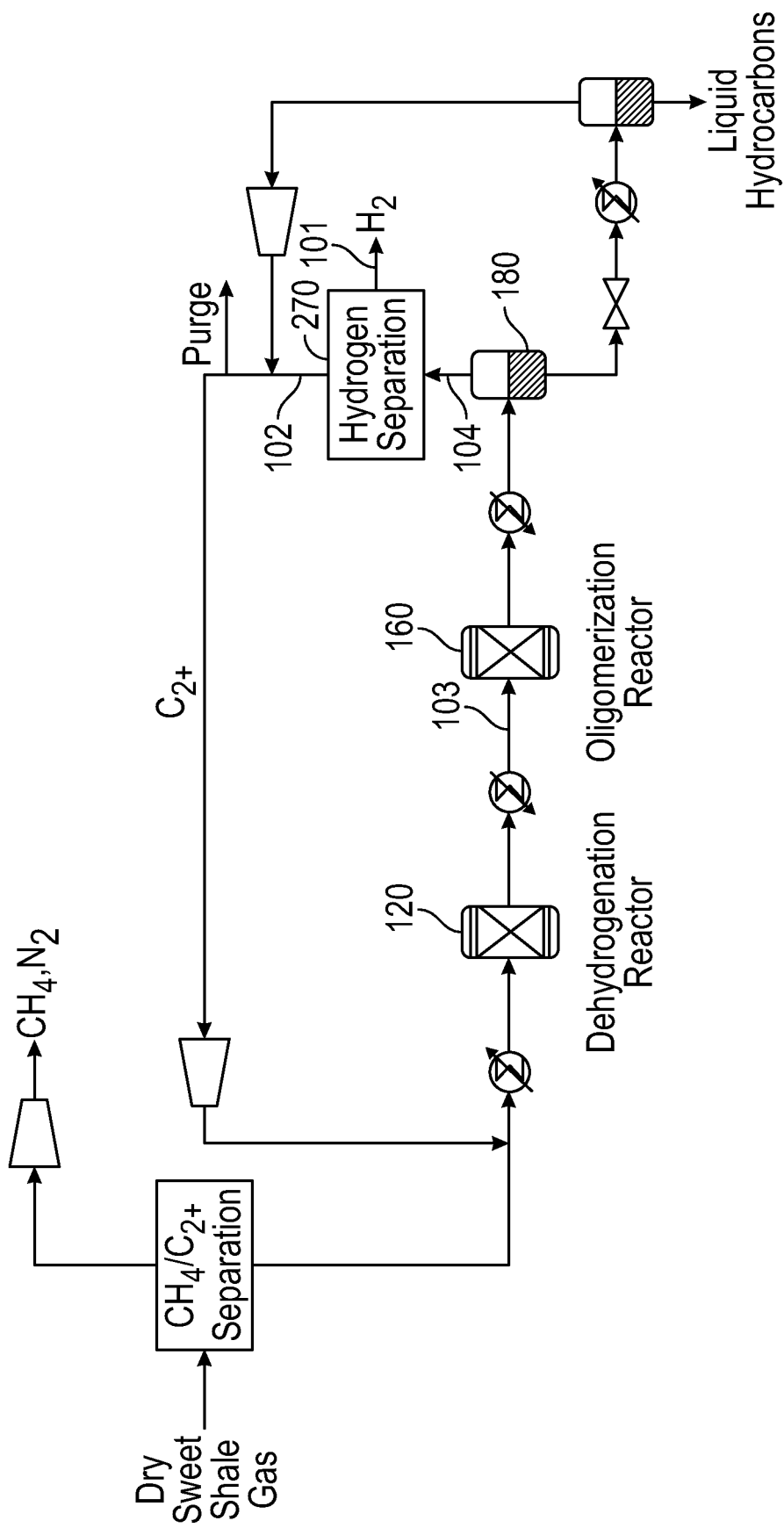
FIG. 4 is a block flow diagram for an embodiment of the present disclosure.

An embodiment of the present disclosure is a novel process that is useful when hydrogen tolerant oligomerization catalyst is available. Hydrogen tolerant oligomerization catalyst is defined as a catalyst that can perform alkene coupling on alkenes, such as a mixture of $C_2$, $C_3$, $C_4$, $C_5$ alkenes, with a substantial concentration of hydrogen (>5 mole percent). FIG. 4 illustrates a variation of the process described in FIG. 2 wherein a hydrogen tolerant oligomerization catalyst is employed. The partial pressure of hydrogen in stream 103 exiting the dehydrogenation reactor 120 is lower than the partial pressure of the hydrogen in vapor stream 104 as light alkenes have been both converted and removed as high molecular weight hydrocarbons by oligomerization reactor 160 and separator 180. This higher partial pressure of hydrogen in vapor stream 104 can be exploited by performing hydrogen separation with separator 270 to remove hydrogen via stream 101 and produce a hydrogen lean stream 102. Ultimately, this process has a reduced capital expense for separator 270 compared to separator 140 in FIG. 2.

Figure 5:
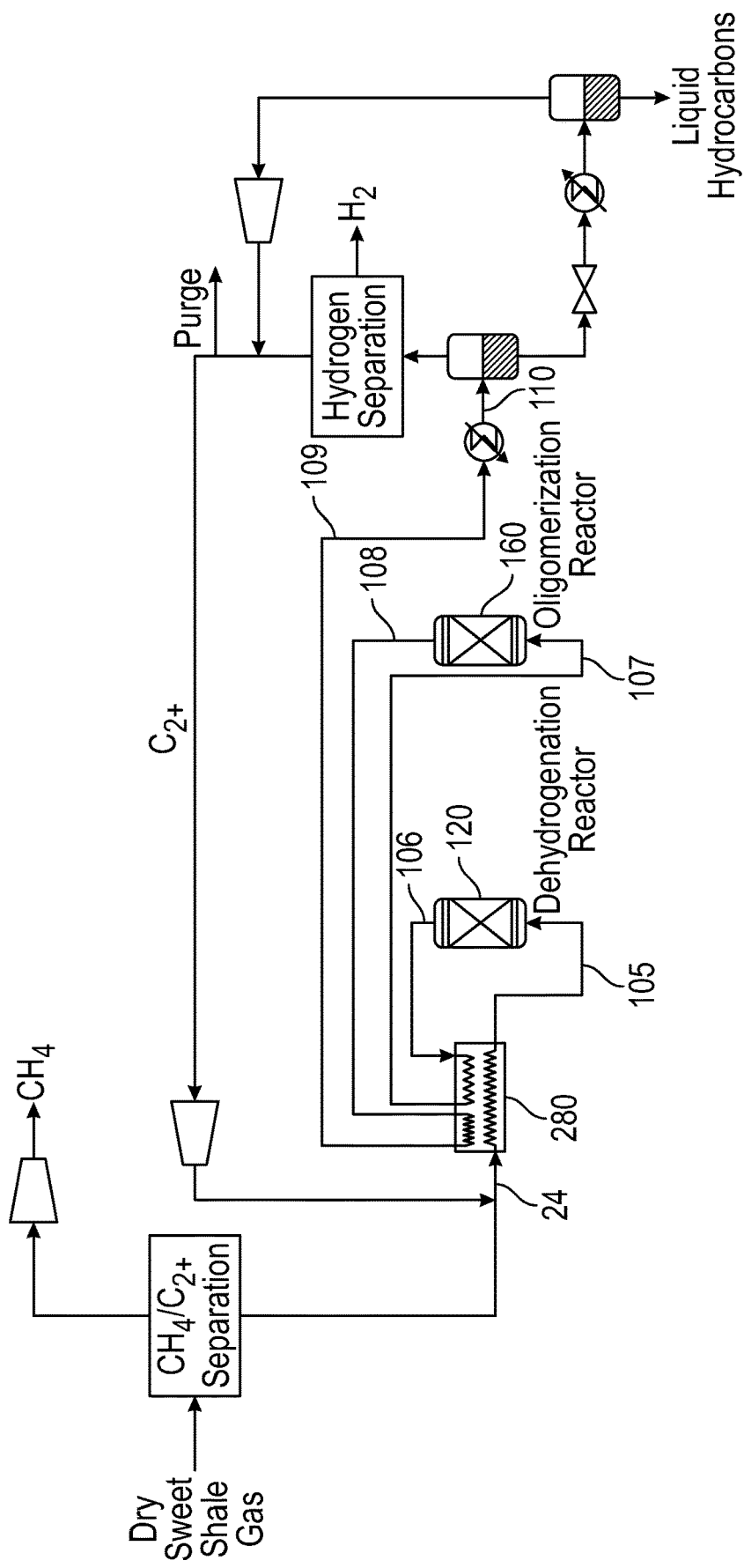
FIG. 5 is a block flow diagram for an embodiment of the present disclosure.

To minimize heat input into the processes, heat and mass integration can be performed on the described process. An example of integrated process design for the process in FIG. 4 is shown in FIG. 5. In this example, heat exchangers 110, 130, 170 within the recycle loops are coupled such that the remaining heat duty is for the catalytic dehydrogenation reactor 120 that operates at elevated temperature, such as from 500°-800° C. Combined stream 24 enters a process-to-process heat exchanger 280 and is heated using stream 108 and stream 106 which exit oligomerization reactor 160 and dehydrogenation reactor 120, respectively. The resulting heated stream 105 enters dehydrogenation reactor 120 and exhaust stream 106 enters heat exchanger 280. Heat from stream 106 is transferred to stream 24 until stream 106 temperature reaches the operating temperature of oligomerization reactor 160. Exhaust stream 108 from oligomerization reactor 160 enters heat exchanger 280 and transfers its heat before exiting as stream 109. Finally, stream 109 is cooled to low temperature (~2°-10° C.) and exits a two-phase stream 110. There are other integrated process configurations that have not been illustrated here. This integrated process flowsheet reduces the number of heat exchangers and also utilities costs which ultimately lead to reduction in the total capital cost and annual operating costs.

Further examples of integrated process design can include integration with an existing NGL extraction plant, such as by utilizing waste heat from the NGL plant to provide a portion of the heat load required for the dehydrogenation reaction. In a non-limiting example the recompression of residue gas from an NGL extraction plant may be provided by one or more gas fired turbine driven compressor. The turbine exhaust temperature can be more than 600° C. and can be used as a heat source within the NTL process.

Figure 6:
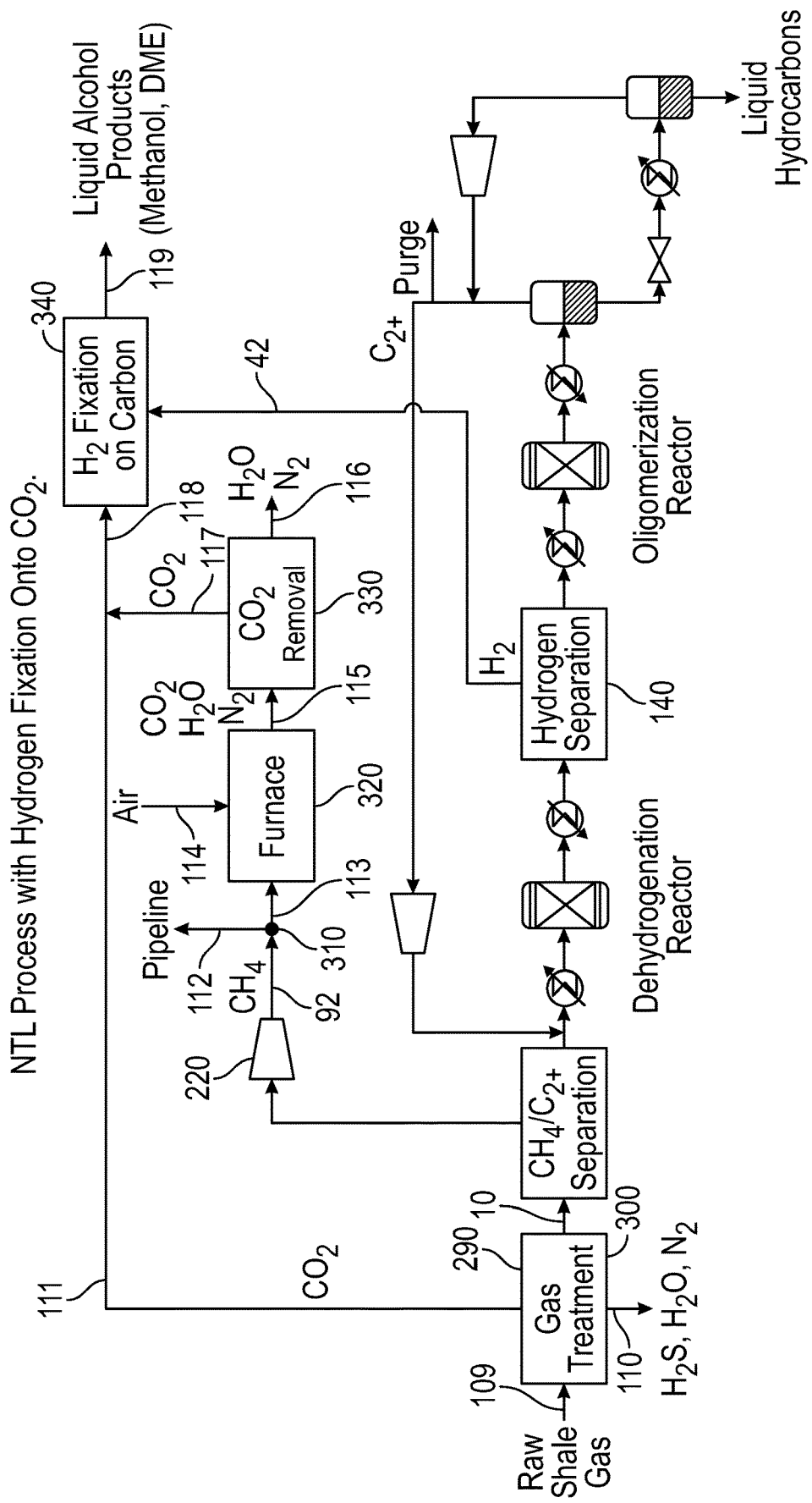
FIG. 6 is a block flow diagram for an embodiment of the present disclosure.
Figure 7:
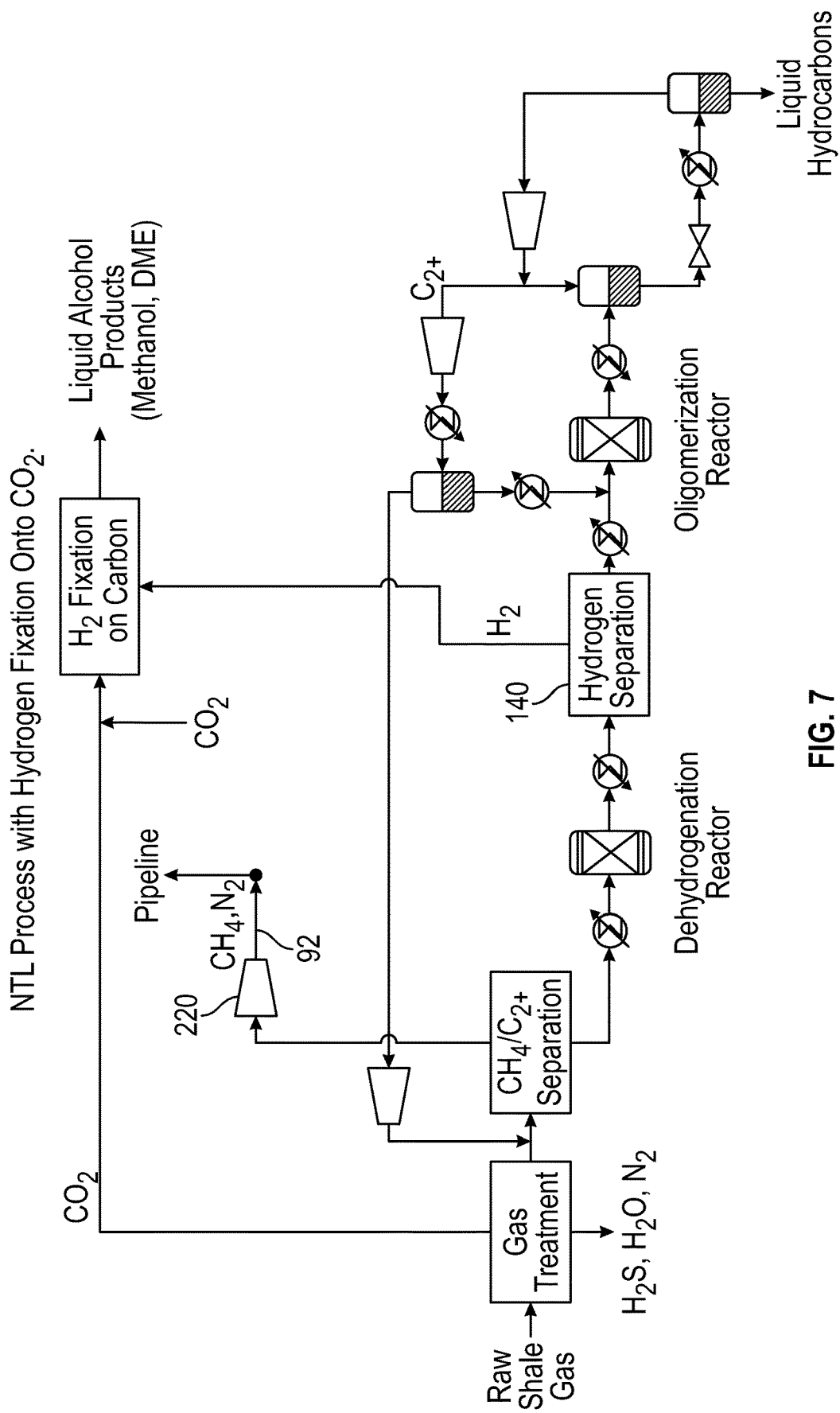
FIG. 7 is a block flow diagram for an embodiment of the present disclosure.

Hydrogen is a by-product of a dehydrogenation reactor and it can be utilized in several ways depending on the deployment of the NTL process. Where the NTL process is integrated into a large refinery complex, then the produced hydrogen can be delivered into processes that require them either as feedstocks or as fuels. Produced hydrogen can be utilized in a saturation step to more fully saturate the produced hydrocarbon liquids and reduce the olefin content. In remote locations, hydrogen must be used or transformed on-site as hydrogen pipeline infrastructure is not extensive. Although it is intuitive to utilize hydrogen as fuel gas to supply heat for dehydrogenation reactor, hydrogen can also be used to fix any available on-site $CO_2$ into valuable chemicals such as methanol and dimethyl ether which are also liquid at ambient temperature and pressure. This proposed NTL process with hydrogen fixation on $CO_2$ is described in FIGS. 6 and 7. In FIGS. 6 and 7, the hydrogen fixation process is integrated with NTL processes described in FIGS. 2 and 3, respectively. In FIG. 2, raw shale gas stream 109 coming out of the wellhead usually contains varying concentrations of $CO_2$, $N_2$, $H_2S$, and $H_2O$, which may need to be removed before it can enter the natural gas pipeline or undergo further processing. The removal process 290 is generally called gas treatment which may entail some or all the following processes: acid gas removal, dehydration, membrane separation, and cryogenic distillation. From gas treatment 290, a $CO_2$ stream 111 is recovered and hydrocarbon gas stream 10 is sent for further processing as described in FIG. 2. A portion of the methane rich stream 92 can be used to supply heat for other unit operations such as a dehydrogenation reactor by combusting the split stream 113 in a furnace 320 with an air stream 114. The exhaust gas stream 115 from furnace 320 enters separator 330 to generate a $CO_2$ rich stream 117. Streams 111 and 117 can then be combined and enter a hydrogen fixation process 340. The hydrogen stream 42 that is separated by hydrogen separator 140 can be sent to a hydrogen fixation process 340. Direct hydrogenation of $CO_2$ to methanol can occur at medium temperature (~235°-250° C.) and medium pressure (~5-50 bar) using Cu/Zn catalysts. The resulting outlet stream 119 contains methanol and other products such as higher boiling alcohols and dimethyl ether. This process allows co-production of valuable chemicals and liquid hydrocarbons while reducing the $CO_2$ emission from the process.

An embodiment of the present disclosure is a process to catalytically transform natural gas liquid (NGL) into higher molecular weight hydrocarbons includes providing an NGL stream, catalytically dehydrogenating at least a portion of the NGL stream components to their corresponding alkene derivatives, catalytically oligomerizing at least a portion of the alkenes to higher molecular weight hydrocarbons and recovering the higher molecular weight hydrocarbons. The NGL stream can be extracted from a gas stream such as a gas stream coming from shale formations. The higher molecular weight hydrocarbons can be hydrocarbons that are liquid at ambient temperature and ambient pressure.

In an embodiment, the process can include a multi-stage separation configuration to recover a portion of the light alkenes from a recycle loop and use the light alkenes as feed to the catalytic oligomerization. A hydrogen tolerant oligomerization catalyst can be used and hydrogen separation can be employed from a recycle stream. The process can include process-to-process heat exchangers employed to provide heat recovery within a recycle loop. The process can optionally include a hydrogen fixation onto $CO_2$ process employed to generate liquid alcohol products, such as methanol, dimethyl ether, and higher boiling alcohols.

The text above describes one or more specific embodiments of a broader disclosure. The disclosure also can be carried out in a variety of alternate embodiments and thus is not limited to those described here. The foregoing description of an embodiment of the disclosure has been presented for the purposes of illustration and description. It is not intended to be exhaustive or to limit the disclosure to the precise form disclosed. Many modifications and variations are possible in light of the above teaching. It is intended that the scope of the disclosure be limited not by this detailed description, but rather by the claims appended hereto.

What is claimed is:

1. A non-oxidative process for catalytically transforming a natural gas liquid (NGL) into one or more higher molecular weight hydrocarbons, comprising:
   providing a hydrocarbon containing gas stream comprising $C_2$ and $C_3$ alkanes;
   catalytically dehydrogenating at least a portion of the hydrocarbon containing gas stream to corresponding alkene derivatives using at least one bimetallic catalyst, providing an effluent comprising of unreacted $C_2$-$C_3$ alkanes, $C_2$-$C_3$ alkenes and hydrogen;
   catalytically oligomerizing at least a portion of the alkenes in the effluent to provide one or more higher molecular weight hydrocarbons; and
   recovering the higher molecular weight hydrocarbons.

2. The process according to claim 1, wherein the hydrocarbon containing gas stream is derived from a shale formation.

3. The process according to claim 1, further comprising recycling unreacted alkanes and alkenes after the catalytic oligomerization reaction.

4. The process according to claim 1, wherein the at least one bimetallic catalyst comprises a first metal chosen from the group consisting of Pt, Pd, Co, Fe, Rh, Ir, and Ru, and a second metal chosen from the group consisting of Zn, Mn, V, and Cr.

5. The process according to claim 1, wherein the at least one bimetallic catalyst is chosen from the group consisting of PtZn, PdZn, PtIn, PdIn, PtMn, PtCr, PtV, and PdMn.

6. The process according to claim 1, wherein the at least one bimetallic catalyst comprises a support of refractory oxide chosen from the group consisting of silica, alumina, silica-alumina, titania, magnesium oxide, zeolites, aluminophosphates and combinations thereof.

7. The process according to claim 1, wherein the at least one bimetallic catalyst is a zero valent metallic alloy that comprises a combination of a first metal chosen from the group consisting of platinum and palladium, and a second metal chosen from the group consisting of manganese, vanadium, chromium and combinations thereof, and a support.

8. The process according to claim 1, further comprising removing the hydrogen after catalytic dehydrogenation; and utilizing the removed hydrogen to increase saturation and reduce the alkene content of the higher molecular weight hydrocarbon stream.

9. The process according to claim 1, wherein the at least one bimetallic catalyst comprises a support of refractory oxide chosen from the group consisting of silica, alumina, and zeolites.

10. The process according to claim 1, wherein the hydrocarbon containing gas stream comprising $C_2$ and $C_3$ alkanes contains no isobutane.

11. A non-oxidative process for catalytically transforming a natural gas liquid (NGL) into one or more higher molecular weight hydrocarbons, comprising:
   providing a hydrocarbon containing gas stream consisting of $C_2$ and $C_3$ alkanes;
   catalytically dehydrogenating at least a portion of the hydrocarbon containing gas stream to corresponding alkene derivatives and hydrogen using at least one bimetallic catalyst, providing an effluent consisting of unreacted $C_2$-$C_3$ alkanes, $C_2$-$C_3$ alkenes and hydrogen;
   catalytically oligomerizing at least a portion of the $C_2$-$C_3$ alkenes in the presence of at least one oligomerization catalyst to provide one or more higher molecular weight hydrocarbons; and
   recovering the higher molecular weight hydrocarbons,
   wherein the at least one oligomerization catalyst comprises H-ZSM-5, B—Al—H—ZSM-5, or a combination thereof.

12. The process according to claim 11, wherein the hydrocarbon containing gas stream is derived from a shale formation.

13. A process for catalytically transforming a natural gas liquid (NGL) into one or more higher molecular weight hydrocarbons, comprising:
   providing a hydrocarbon containing gas stream that is derived from a shale formation, the stream comprising one or more light alkanes chosen from the group consisting of $C_2$, $C_3$, $C_4$, $C_5$, and combinations thereof;
   catalytically dehydrogenating at least a portion of the light alkanes to corresponding alkene derivatives;
   catalytically oligomerizing at least a portion of the alkenes in the presence of at least one oligomerization catalyst to provide one or more higher molecular weight hydrocarbons; and
   recovering the higher molecular weight hydrocarbons,
   wherein the at least one oligomerization catalyst comprises: a crystalline microporous zeolite structure having MFI topology; heteroatoms within the MFI structure selected from the group consisting of aluminum, gallium, iron and combinations thereof; and trivalent boron atoms within the MFI structure that have been substituted for tetravalent silicon atoms.

14. The process according to claim 13, wherein the boron is present in an amount ranging from 0.001 wt % to 10 wt % on an elemental basis of the oligomerization catalyst.

15. The process according to claim 13, wherein the aluminum, gallium or iron are present in an amount from 0.001 wt % to 30 wt % on an elemental basis of the oligomerization catalyst.

16. The process according to claim 13, wherein the substitution of trivalent boron atoms for tetravalent silicon atoms do not behave as Brönsted acid sites for catalysis.

17. The process according to claim 13, wherein a Brönsted acid site that compensate framework boron atoms have low activity compared to those that compensate framework aluminum or gallium or iron atoms.

18. The process according to claim 13, wherein a Brönsted acid site that compensate framework boron atoms are significantly weaker acid sites compared to those that compensate framework aluminum or gallium or iron atoms.

* * * * *